(12) United States Patent
Schulte

(10) Patent No.: US 7,679,331 B2
(45) Date of Patent: Mar. 16, 2010

(54) POWER CONTROL CIRCUITS

(75) Inventor: Robert B. Schulte, Springboro, OH (US)

(73) Assignee: Avery Dennison Corporation, Pasadena, CA (US)

( * ) Notice: Subject to any disclaimer, the term of this patent is extended or adjusted under 35 U.S.C. 154(b) by 606 days.

(21) Appl. No.: 11/252,337

(22) Filed: Oct. 17, 2005

(65) Prior Publication Data

US 2007/0090800 A1 Apr. 26, 2007

(51) Int. Cl.
*H02J 7/00* (2006.01)
(52) U.S. Cl. .................................. 320/134; 320/136
(58) Field of Classification Search .................. 347/5, 347/19; 361/62, 18, 54–56; 320/134, 136
See application file for complete search history.

(56) References Cited

U.S. PATENT DOCUMENTS 6,481,814 B2 * 11/2002 DeMoor et al. ................ 347/5

OTHER PUBLICATIONS

Carroll et al., Design of a motor speed comtroller for a lightweight electric vehicle, Oct. 1999, IEEE, pp. 559-562.*
Motorola, Datasheet for 68HC12, Jul. 2000, Motorola, Rev.1.0, pp. 1-16.*
Mitsumi, "Protection of Lithium Ion Batteries (two cells in series) MM1292, 1302" (7 pages).
Benchmarq Microelectronics, Inc., "Lithium Ion Pack Supervisor for 2-Cell Packs bq2058T", Jul. 1997, (18 pages).
Sieko Instruments Inc., "Battery Protection IC for 2-Cell Serial Pack—S-8232 Series", Rev. 4.3_01, (26 pages).

* cited by examiner

*Primary Examiner*—Bao Q Vu
*Assistant Examiner*—Jue Zhang

(57) ABSTRACT

Power control systems and methods are provided to control when and how power is removed from devices. A power control system includes a sensing module that detects an output voltage level of a battery pack. A shutoff module initiates a shutoff routine when the output voltage level decreases to a device shutoff voltage level. The device shutoff voltage level is greater than the battery pack shutoff voltage level. A bypass module prevents the initiation of the shutoff routine when the device performs one or more operations that are known to cause high battery current spikes that will resultant in significant voltage drops from the battery pack.

21 Claims, 6 Drawing Sheets

POWER CONTROL CIRCUITS

FIELD OF THE INVENTION

Aspects of the present invention relate to battery protection circuits. More specifically, aspects of the present invention provide battery protection circuits that may bypass shutoff procedures during known high demand conditions.

BACKGROUND

It is common for existing battery packs, such as lithium ion battery packs, to have a low voltage protection circuits integrated into the battery packs. When the battery voltage drops below a predetermined voltage the low voltage protection circuit turns off the battery pack. The low voltage protection circuit then will not let the battery pack resume providing power until the voltage exceeds a predetermined voltage and the battery pack is removed from the circuit and reinserted into the host device. For example, a battery pack having a low voltage protection circuit having a threshold voltage of 6.0 volts will be shutoff by the low voltage protection circuit when the battery pack generates an output voltage of less than 6.0 volts. Even after the battery pack has been removed and reinserted, the low voltage protection circuit will not allow the battery to provide power until the voltage generated by the battery pack exceeds 6.5 volts.

There are several drawbacks associated with such conventional battery packs. Existing devices that use conventional battery packs are forced to stop operating when the conventional low voltage protection circuit removes power. This can be problematic in many situations, such as when data is stored in a volatile memory or when a device shutdown procedure is desired for proper operations.

Another drawback associated with conventional battery packs that include low voltage protection circuits is that the low voltage protection circuits do not account for predictable and momentary high current drain conditions. For example, a printing device may have a high current drain and produce a low output voltage during a printing operation. This momentary low voltage condition may cause the low voltage protection circuit to shut off power, even though the battery pack does not need to be recharged.

Therefore, there is a need in the art for systems and methods that provide better control over how and when power is removed from battery packs during low voltage conditions.

BRIEF SUMMARY

Aspects of the present invention address one or more of the issues mentioned above, thereby providing device power control systems that better control when and how power is removed from devices. In one embodiment of the invention a power control system includes a sensing module, a shutoff module and a bypass module. The sensing module may be used to detect an output voltage level of a battery pack. The shutoff module initiates a shutoff routine when the output voltage level decreases to a device shutoff voltage level. The device shutoff voltage level is greater than the battery pack shutoff voltage level. The bypass module prevents the initiation of the shutoff routine when the device performs one or more operations that are known to cause high battery current spikes. The shutoff routine may include removing power from all components or may include additional steps such as saving data stored in volatile memory, removing power from components in a predetermined sequence, alerting the user that the device will be shutdown, etc.

In a second embodiment a power control system includes a sensing module and a shutoff module. The sensing module detects output voltage levels of a battery pack and generates an average voltage level that represents a voltage level that is between a current output voltage level and an output voltage level that existed at a previous time. The shutoff module initiates a shutoff routine when the average voltage level decreases to a device shutoff voltage level. The device shutoff voltage level is greater than a battery pack shutoff voltage level.

In other embodiments of the invention, computer-executable instructions for implementing the disclosed methods are stored as control logic or computer-readable instructions on computer-readable media, such as an optical or magnetic disk.

BRIEF DESCRIPTION OF THE DRAWINGS

Aspects of the present invention are described with respect to the accompanying figures, in which like reference numerals identify like elements, and in which.

DETAILED DESCRIPTION

Figure 1:
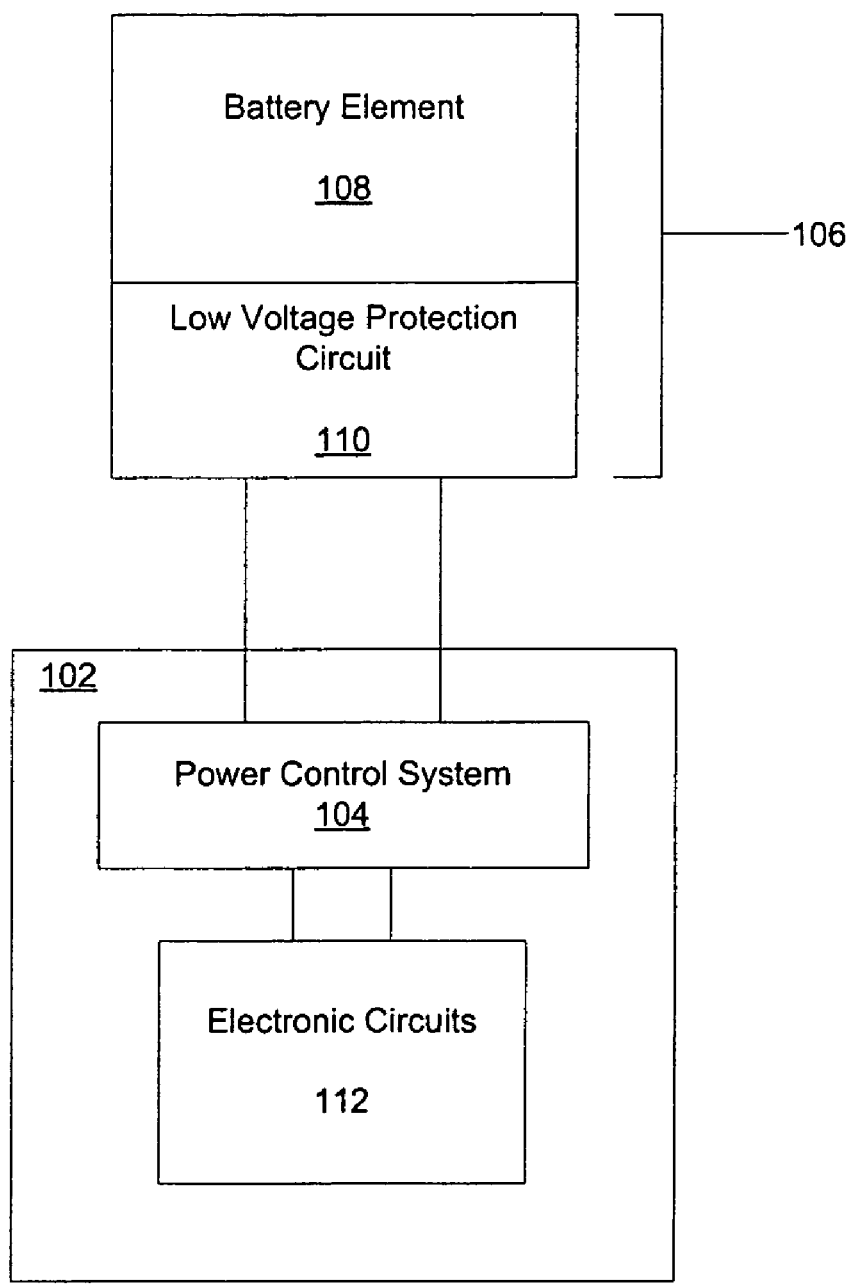
FIG. 1 shows a functional block diagram of a device having a power control system in accordance with an embodiment of the invention.

FIG. 1 shows a functional block diagram of a device 102 having a power control system 104, in accordance with an embodiment of the invention. A rechargeable battery pack 106 includes battery element 108 and a low voltage protection circuit 110. Battery pack 106 may be implemented with a conventional battery pack, such as a lithium ion battery pack. Low voltage protection circuit 110 shuts off power when an output voltage produced by battery element 108 drops below a battery pack shutoff voltage level.

Power control system 104 may be configured to sense the voltage level generated by battery pack 106 and initiate a shutdown routine when the sensed voltage reaches a device shutoff voltage level. The device shutoff voltage level exceeds the battery pack shutoff voltage level. As is described below, the shutoff routine may include saving data stored in volatile memory and shutting down electronic circuits 112 in a predetermined order. In some embodiments of the invention, power control system 104 enables the resumption of power to electronic circuits 112 when the output voltage of battery pack 106 increases to a turn-on voltage that exceeds the device shutoff voltage level.

Figure 2:
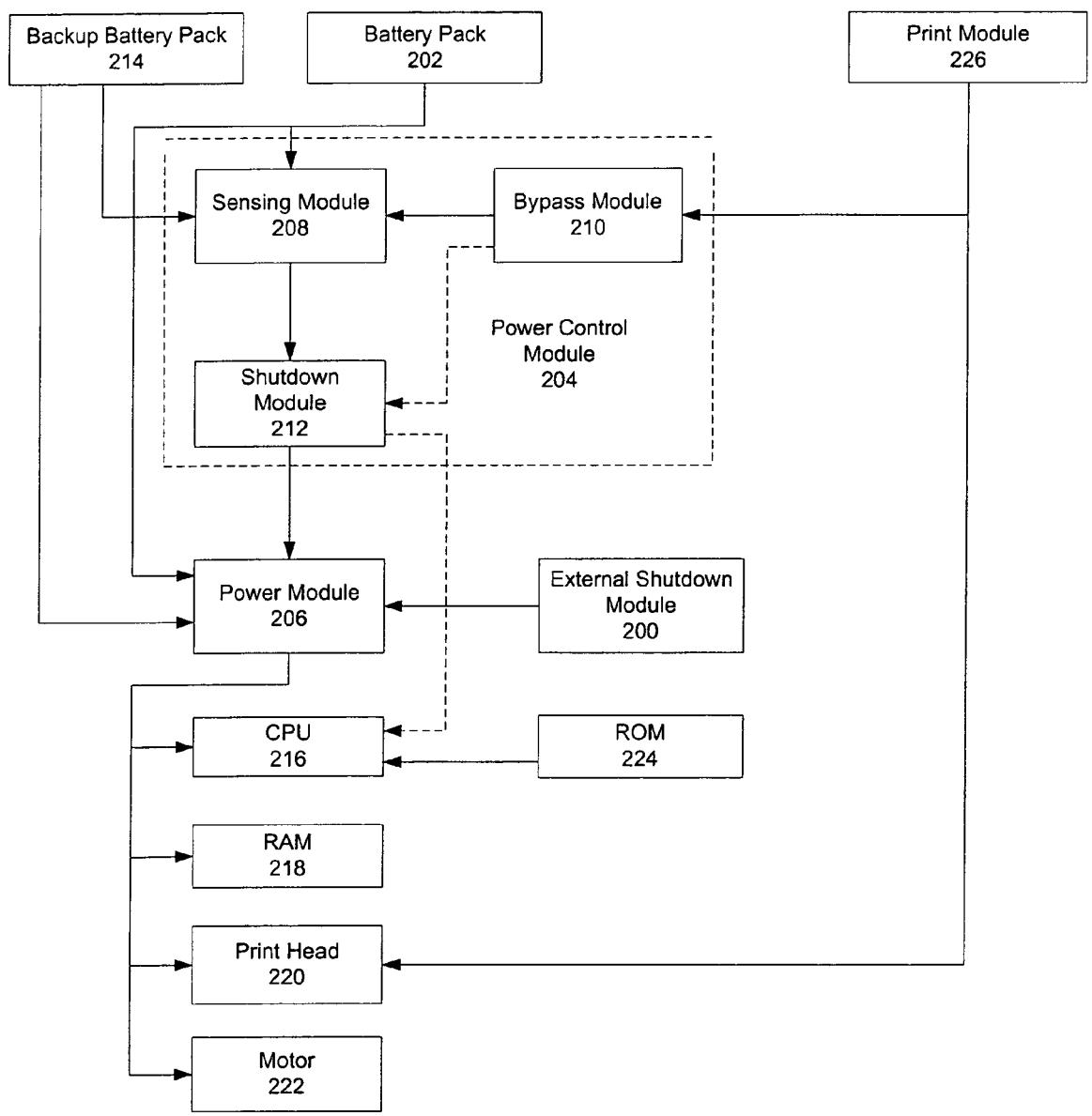
FIG. 2 shows a functional block diagram of a handheld printer implementation that includes a power control module in accordance with an embodiment of the invention.

FIG. 2 shows a functional block diagram of a handheld printer implementation that includes a power control module in accordance with an embodiment of the invention. A battery pack 202 provides power to a power control module 204 and a power module 206. Power control module 204 may include a sensing module 208, a bypass module 210 and a shutdown module 212. Sensing module 208 detects an output voltage level generated by battery pack 202 and may compare the detected voltage level to a predetermined device shutoff off voltage level. Shutdown module 212 may initiate a shutdown routine when the detected voltage level falls below the device shutoff voltage level. In one embodiment of the invention, shutdown module 212 receives a signal from sensing module 208 when the detected voltage level falls below the device shutoff voltage level and the received signal causes shutdown module 212 to initiate the shutdown routine. In various embodiments of the invention the shutdown routine may be performed by shutdown module 212, power module 206 or a central processing unit (CPU) 216. The shutdown routine may be as simple as removing power from all components or may include additional steps such as saving data stored in volatile memory, removing power from components in a predetermined sequence, etc.

Bypass module 210 may be coupled to sensing module 208 and/or shutdown module 212 to prevent the initiation of the shutdown routine during operations that are known to cause high battery current spikes, such as during printing operations. High battery current spikes result in reduced battery output voltage levels. Power module 206 receives power from battery pack 202 and may regulate, filter or otherwise process the power delivered by battery pack 202 before delivering the power to printer components. A backup battery pack 214 may be included to provide power when battery pack 202 fails or produces an output voltage that falls below the device shutoff voltage level. Power module 206 may provide power to CPU 216, a volatile random access memory (RAM) 218, a print head 220 and a motor 222.

CPU 216 may retrieve computer executable instructions from RAM 218 or a read only memory (ROM) 224 and process those instructions in a conventional manner. RAM 218 may include label data and/or other volatile data. ROM 224 may include firmware, the shutdown routine and/or other nonvolatile data. Print head 220 may be implemented with a thermal print head, inkjet print head or another type of print head for printing on a web or label. Print head 220 may receive print commands from a print module 226. Print module 226 may also provide a signal to bypass module 210 to indicate that the printer is performing a print operation. Various embodiments of the invention may also include conventional handheld printer components, such as those shown in FIG. 3.

Figure 3:
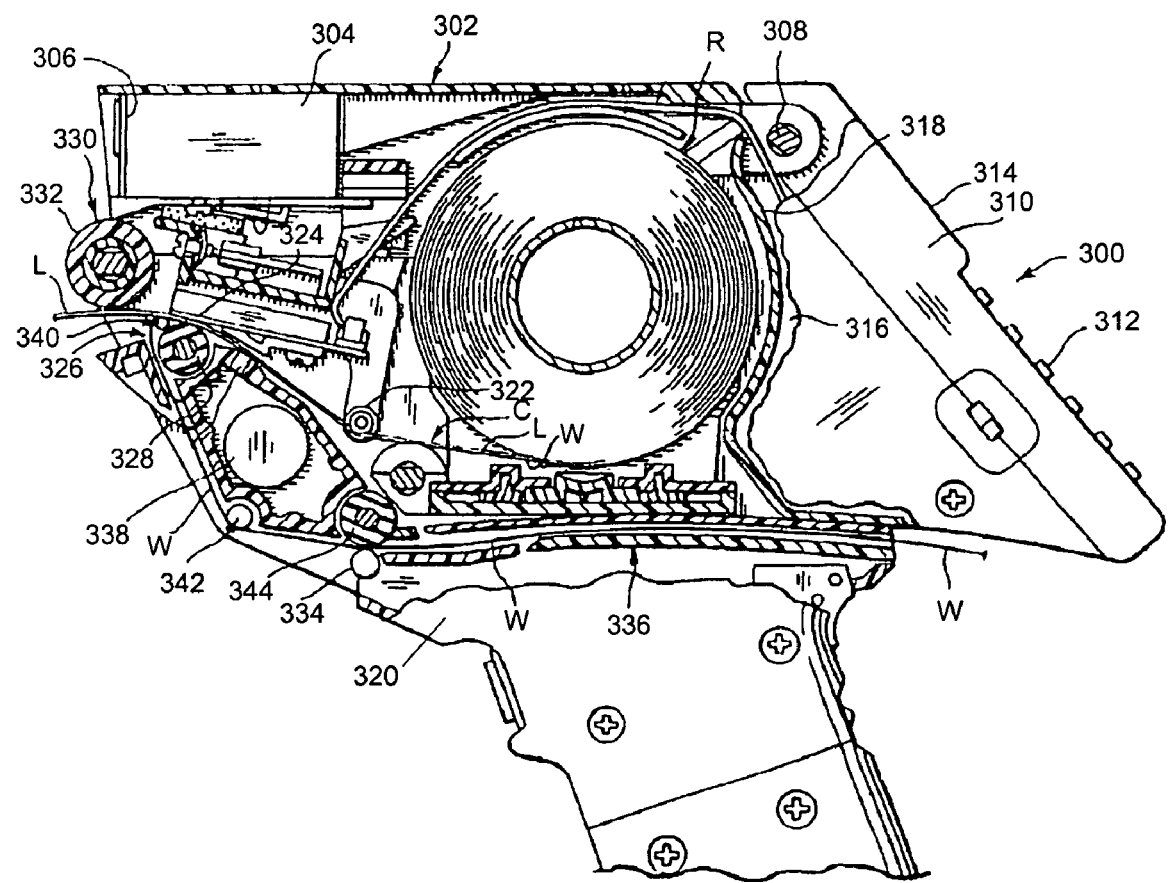
FIG. 3 shows a conventional handheld printer device that may be used in connection with various embodiments of the invention.

FIG. 3 shows a handheld printer 300 described in U.S. Pat. No. 5,486,259, the entire disclosure of which is hereby incorporated by reference. Printer 300 that has a movable housing section or cover 302 which carries a scanner 304 and a lens 306 mounted at the front end of the scanner 304. Cover 302 is movable between a closed position shown in FIG. 3 and an open position by pivoting the cover 302 about a pivot 308. A movable housing section 310 mounts a keyboard 312 and a display 314 about pivot 308 so that housing section 310 can be moved between its closed position and an open position for servicing the electronic components (not shown) housed in a chamber 316 defined in part by a wall 318.

Printer 300 mounts a roll R of a composite web C of record members illustrated to be a series of labels L releasably adhered to a carrier web W. Roll R is mounted within the housing 320 and the composite web C passes from the roll R into guided relationship with a guide roll 322 and from there to between a print head 324 and a platen 326. Platen 326 is shown to include a platen roll 328. Adjacent print head 324 is a delaminator 340 about which the carrier web W passes. A label L is delaminated from the carrier web W as the web W is advanced. The label L is advanced following printing into label applying relationship to and under an applicator 330 which is shown to comprise a roll 332. Carrier web W passes from delaminator 340 into contact with platen roll 328, about a guide roller 342 into the nip of a feed roll 344 and a back-up roll 334 and through a chute generally indicated at 336 from which the carrier web W exits housing 320. A motor 338 may be included for advancing composite web C through printer 300.

Figure 4:
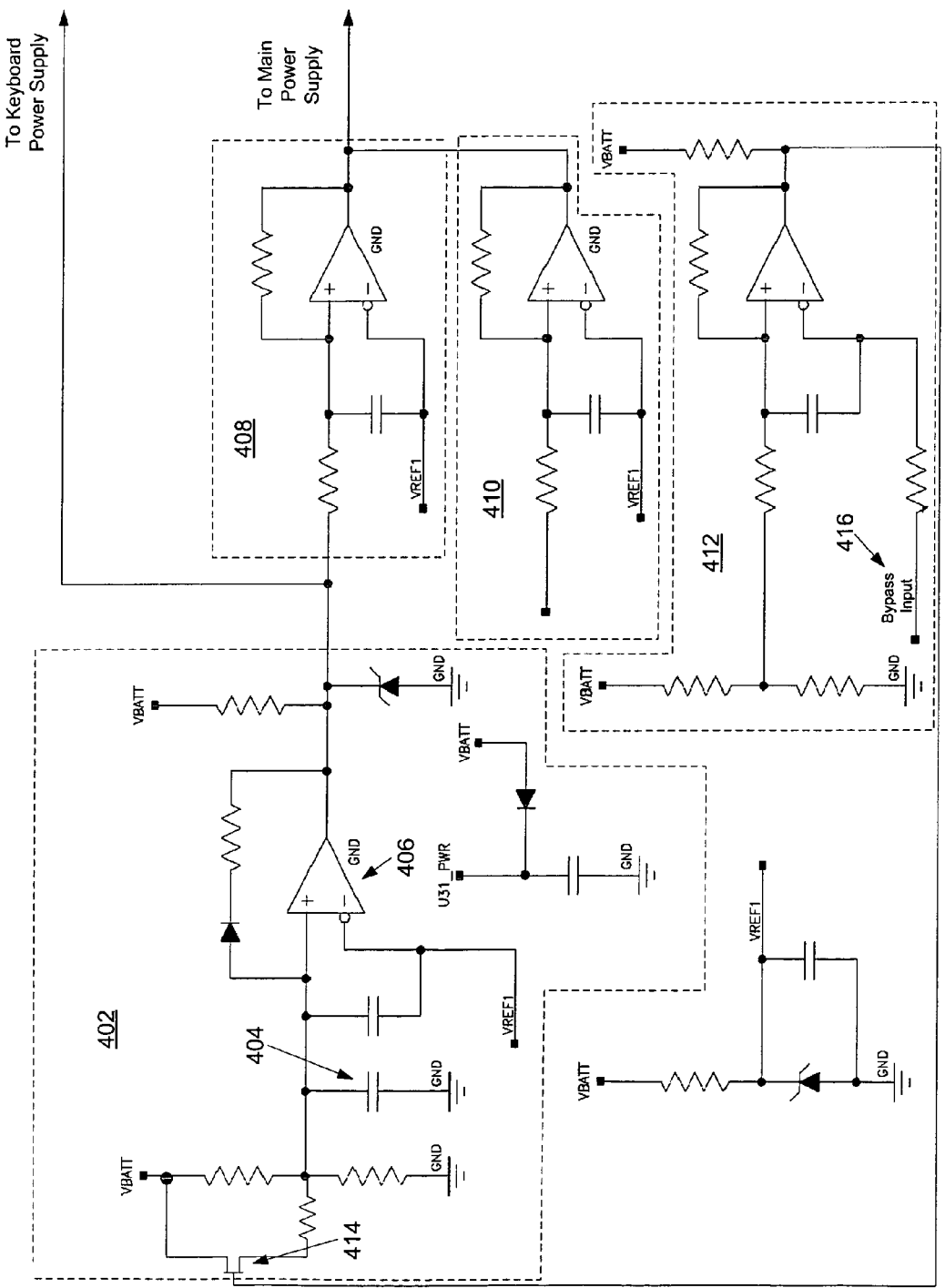
FIG. 4 is a circuit diagram of an analog embodiment of the invention.

FIG. 4 is a circuit diagram that illustrates an analog embodiment of the invention. A sensing circuit 402 detects an output voltage level of a battery pack. In one embodiment of the invention, an averaging capacitor 404 is included to generate an average voltage level that represents a voltage level between a current output voltage level and an output voltage level that existed at a previous time. With this embodiment, high battery current spikes initially do not result shutdown, but will result in shutdown if they exist for a long enough time period. Sensing circuit 402 may also include a solid state comparator circuit 406 to detect voltage levels. A shutoff circuit 408 may be used to shutdown one or more power supplies included within a device, such as a printer. An external shutdown circuit 410 may be used by an operator to shutoff the device during routine or regular shutoffs. A bypass circuit 412 may be used to bypass sensing circuit 402 during operations that are known to cause high battery current spikes. In the embodiment shown, bypass circuit 412 applies a bypass signal to a field effect transistor 414 during bypass operations. Bypass circuit 412 may alternatively bypass shutoff circuit 408 during operations that are known to cause high battery current spikes. As shown in FIG. 4, sensing circuit 402, shutoff circuit 408, external shutoff circuit 410 and bypass circuit 412 may include solid state amplifier and switching elements, such as operational amplifiers. Bypass circuit 412 receives a bypass input 416, which may be from a microprocessor, and disables sensing circuit 402 which, in turn disables shutoff circuit 408 during known high current spikes.

Figure 5:
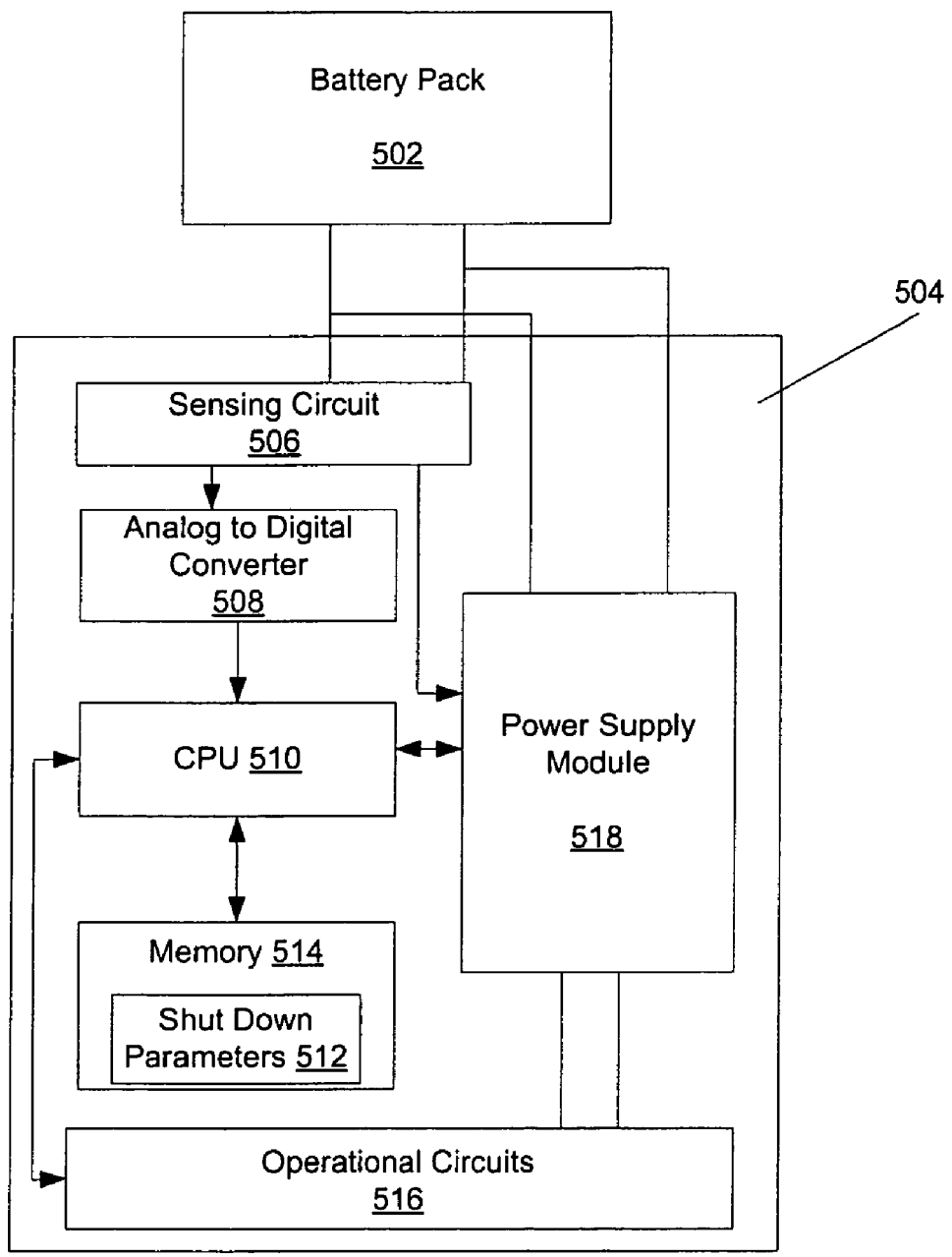
FIG. 5 is a circuit diagram of a digital embodiment of the invention.

FIG. 5 is a circuit diagram that illustrates a digital embodiment of the invention. A battery pack 502 is shown coupled to a device 504. Device 504 may be a portable handheld printer device, a motor or some other device that causes high battery current spikes. A sensing circuit 506 may be used to sense the output voltage level from battery pack 502. Sensing circuit 506 may be implemented with a conventional analog voltage sensing circuit. In one embodiment of the invention, sensing circuit 506 may include an averaging capacitor, such as averaging capacitor 404 (shown in FIG. 4) or another element that performs a function similar to that of averaging capacitor 404. Sensing circuit 506 may also provide a shutdown signal to power supply module 518 when it is desired to remove power, such as when battery pack 502 operates continuously for a predetermined time or just prior to reaching a shutoff limit of battery pack 502.

The output of sensing circuit 506 may be in the form of an analog voltage signal that is transmitted to an analog-to-digital converter 508. Analog-to-digital converter 508 converts the analog voltage signal into a digital signal that is then provided to a central processing unit (CPU) 510. In some embodiments of the invention, the output of battery pack 502 may be provided directly to analog-to-digital converter 508. CPU 510 may access shutdown parameters 512 stored in a memory 514 and determine when to shutoff operational circuits 516. Operational circuits 516 represent the circuits used to perform the operations of device 504 and may include a motor, a print head, a scanner or other elements. Shutdown parameters may include a minimum voltage level, time period at a minimum voltage level, minimum current amount, a voltage spread between a peak voltage and a current voltage or any other parameters that may be used to determine when to shutoff prior to battery pack 502 shutting off. Memory 514 may be implemented with a nonvolatile memory, such as a read only memory.

CPU 510 may also receive data from operational circuits 516 to determine when to bypass a shutdown routine. For example, a signal that indicates that a print head is operating may be used by CPU 510 to bypass a shutoff routine that would otherwise take place. When a shutoff routine is executed, CPU 510 may shutoff certain components in a predetermined order, save data to a nonvolatile memory and/or shutoff a power supply module 518.

Figure 6:
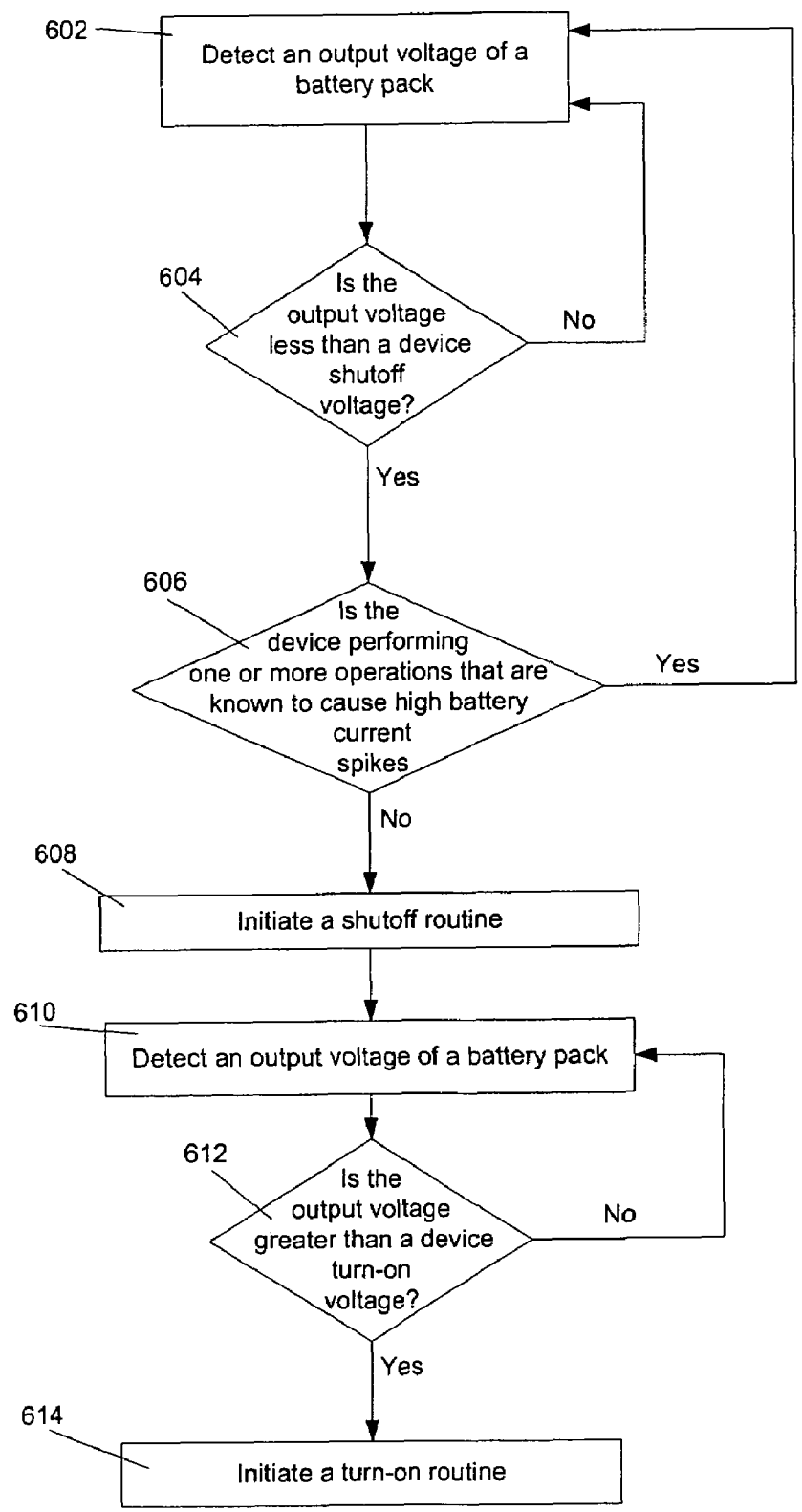
FIG. 6 illustrates a method of controlling power delivered to a device, in accordance with an embodiment of the invention

FIG. 6 illustrates a method of controlling power delivered to a device in accordance with an embodiment of the invention. First, in step 602 the output voltage of a battery pack is detected. Then it is determined whether the output voltage level is less than a device shutoff voltage level in step 604. As described above, the device shutoff voltage level is selected to be higher than a battery pack shutoff voltage level. When the output voltage level is not less than a device shutoff voltage level, the process returns to step 602. Of course a delay period may be included before performing step 602 again. When the output voltage is less than a device shutoff voltage level it is next determined whether the device is performing one or more operations that are known to cause high battery current spikes in step 606. When the device is performing one or more operations that are known to cause high battery current spikes the shutoff routine is bypassed by returning to step 602. Again, a delay period may be included before performing step 602 again. When the device is not performing one or more operations that are known to cause high battery current spikes, in step 608 a shutoff routine is initiated.

After the device has been shut down, in step 610 the output voltage of a battery pack is detected. Then it is determined whether the output voltage is greater than a device turn-on voltage level in step 612. The device turn-on voltage level may be greater than the device shutoff voltage level. When the output voltage is not greater than a device turn-on voltage level the process returns to step 610 after an optional delay. When the output voltage is greater than a device turn-on voltage level a turn-on routine is initiated in step 614. The turn-on routine may include providing power to components in a predetermined order, loading data into a volatile memory or performing other steps that precede operating the device.

It should be noted that the term module used herein refers to functionality of physical structure. Thus, various physical components, such as analog and/or digital circuits, may be combined as desired and appropriate to form the various modules. In addition, the same hardware may be used to provide the functionality of one or more modules. A module may also be broken up or combined and does not have to be a discrete unit. For example, two or more of the circuits shown in FIG. 4 may be modified to have some common circuit elements and each circuit may still be an example of a module.

The present invention has been described in terms of preferred and exemplary embodiments thereof. Numerous other embodiments, modifications and variations within the scope and spirit of the appended claims will occur to persons of ordinary skill in the art from a review of this disclosure.

I claim:

1. A power control system that controls the delivery of electrical power to a printer apparatus, the system comprising:
    a sensing module that detects an output voltage level of a battery pack, wherein the battery pack is configured to shut off the delivery of electrical power therefrom entirely when the output voltage level of the battery pack reaches a battery pack shutoff voltage level;
    a shutoff module coupled to the sensing module and configured to initiate a shutoff routine for the device when the output voltage level of the battery pack decreases to a printer apparatus shutoff voltage level, wherein the printer apparatus shutoff voltage level is greater than the battery pack shutoff voltage level; and
    a bypass module that prevents the initiation of the shutoff routine when the printer apparatus performs one or more operations that are known to cause high battery current spikes.

2. The power control system of claim 1, wherein the sensing module includes a solid state comparator circuit.

3. The power control system of claim 2, wherein the solid state comparator circuit comprises an operational amplifier.

4. The power control system of claim 1, wherein the shutoff routine includes saving data stored in volatile memory.

5. The power control system of claim 1, wherein the shutoff routine includes alerting the user that the printer apparatus will be shutdown.

6. The power control system of claim 1, wherein the shutoff routine is stored in the printer apparatus as computer-executable instructions on a computer-readable memory.

7. The power control system of claim 1, wherein the shutoff module comprises a processor programmed with computer-executable instructions.

8. The power control system of claim 1, wherein the bypass module is configured to stop disabling the shutoff module when a high battery current condition occurs longer than a predetermined period of time.

9. The power control system of claim 1, wherein the shutoff module enables the delivery of power when the output voltage level increases to a printer apparatus turn-on voltage that is higher than the printer apparatus shutoff voltage.

10. The power control system of claim 1, wherein the bypass module disables the sensing module when the printer apparatus performs one or more operations that are known to cause high battery current spikes.

11. The power control system of claim 1, wherein the bypass module disables the shutoff module when the printer apparatus performs one or more operations that are known to cause high battery current spikes.

12. A printing apparatus for printing on labels releasably adhered to a carrier web, the printing apparatus comprising:
    a print head; and
    a power supply module that includes:
    a sensing module that detects an output voltage level of a battery pack, wherein the battery pack is configured to shut off the delivery of electrical power therefrom entirely when the output voltage level of the battery pack reaches a battery pack shutoff voltage level;
    a shutoff module coupled to the sensing module and configured to initiate a shutoff routine when the output voltage level of the battery pack decreases to a printing apparatus shutoff voltage, wherein the printing apparatus shutoff voltage level is greater than the battery pack shutoff voltage level; and
    a bypass module that prevents the initiation of the shutoff routine when the printing apparatus performs one or more operations that are known to cause high battery current spikes.

13. The printing apparatus of claim 12, further including a motor that turns a platen roll to advance a printable web.

14. The printing apparatus of claim 12, wherein the print head comprises a thermal print head.

15. The printing apparatus of claim 12, wherein the print head comprises an inkjet print head.

16. The printing apparatus of claim 12, wherein the sensing module includes a solid state comparator circuit.

17. The printing apparatus of claim 12, wherein the sensing module comprises an analog-to-digital converter and a microprocessor.

18. The power control system of claim 1, wherein the sensing module comprises an analog-to-digital converter.

19. The power control system of claim 1, wherein the printing apparatus comprises a thermal print head.

20. The power control system of claim 1, wherein the shutoff routine is operative to perform at least one of the following: (a) remove delivery of electrical power to at least one component of the printer apparatus and (b) store data from a volatile memory in a nonvolatile memory.

21. The printing apparatus of claim 12, wherein the shutoff routine is operative to perform at least one of the following: (a) remove delivery of electrical power to at least one component of the printing apparatus and (b) store data from a volatile memory in a non-volatile memory.

* * * * *